United States Patent
Gooding (10) Patent No.: US 7,272,734 B2
(45) Date of Patent: Sep. 18, 2007

(54) MEMORY MANAGEMENT TO ENABLE MEMORY DEEP POWER DOWN MODE IN GENERAL COMPUTING SYSTEMS

(75) Inventor: Thomas Michael Gooding, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 10/932,711

(22) Filed: Sep. 2, 2004

(65) Prior Publication Data

US 2006/0047493 A1    Mar. 2, 2006

(51) Int. Cl.
G06F 1/32    (2006.01)
G06F 12/00    (2006.01)

(52) U.S. Cl. .................................. 713/320; 711/165
(58) Field of Classification Search ................ 713/320; 711/165
See application file for complete search history.

(56) References Cited

U.S. PATENT DOCUMENTS

| | | | |
|---|---|---|---|
| 5,036,493 A * | 7/1991 | Nielsen ................. | 365/230.03 |
| 6,141,283 A * | 10/2000 | Bogin et al. ................. | 365/226 |
| 6,462,364 B1 * | 10/2002 | Horiuchi ..................... | 257/288 |
| 6,721,223 B2 * | 4/2004 | Matsumoto et al. ........ | 365/222 |
| 7,010,656 B2 * | 3/2006 | Gupta ......................... | 711/165 |

* cited by examiner

Primary Examiner—Rehana Perveen
Assistant Examiner—Eric Chang
(74) Attorney, Agent, or Firm—Robert R. Williams (57) ABSTRACT

An apparatus and method is disclosed for reducing power consumption in a computing system by moving pages allocated in real memory portions to other real memory portions. When a real memory portion contains no pages, that memory portion can be put into a Deep Power Down (DPD) state that has lower power consumption than when that memory portion is in normal operation. The computing system can also be aware of power consumption of each real memory portion, and, with such awareness, the invention teaches consolidation of pages from real memory portions having relatively higher power consumption to real memory portions having relatively lower power consumption.

2 Claims, 8 Drawing Sheets

MEMORY MANAGEMENT TO ENABLE MEMORY DEEP POWER DOWN MODE IN GENERAL COMPUTING SYSTEMS

BACKGROUND OF THE INVENTION

1. Field of the Invention

The current invention generally relates to computing systems. More specifically, the present invention relates to making saving power in memory by collecting real pages into fewer and/or lower powered real memory portions.

2. Description of the Related Art

Computing systems include a wide range of data processing systems, including Personal Digital Assistants (PDAs), laptop computers, desktop computers, midrange computers, and mainframe computers. Reduction of power consumption is a very important design consideration in development of computing systems. In the laptop market, a reduction in power translates to a longer time period the laptop can be used before a battery in the laptop must be recharged. Alternatively, for a laptop computing system, reduced power consumption can translate into a smaller, cheaper, lighter, battery requirement. In computing systems that are "plugged in" (i.e., connected to an external source of power), a reduction in power translates into cooler, more reliable operation, smaller and/or cheaper power supplies, reduced cooling requirements, or a combination of the above. Reduced electrical bills for a user of the computing system is a marketing advantage for the computing system having lower power requirements for a given level of performance (throughput) of the computing system.

Computing systems typically contain relatively large amounts of volatile storage in the form of static random access memory (SRAM) and dynamic random access memory (DRAM). Recent advances in DRAM technology have included a "Deep Power Down" mode (DPD). Existing computing systems are generally unable to utilize the DPD mode because an operating system in the computing system distributes pages across the entire real memory in the computing system. Placing a real memory portion into the DPD mode causes loss of all data contained within the DRAM. Volatile memory is memory that loses all data contained within that memory when power is removed, either by shutting the memory off or by placing the memory into the DPD mode.

Therefore, there is a need for a method and apparatus that allow use of DPD in computing systems without loss of data.

SUMMARY OF THE INVENTION

The current invention teaches methods and apparatus that allow use of Deep Power Down modes of real memory portions within a plurality of volatile real memory portions without loss of data. Although "Deep Power Down" is an existing mode in Dynamic Random Access Memories, the term Deep Power Down (DPD) is used herein to denote a mode in any type of memory that dramatically reduces power in the memory, but which causes the data loss in a particular memory portion that is placed in the DPD mode. Such memory types include, but are not limited to Dynamic Random Access Memory (DRAM) and Static Random Access Memory (SRAM). The computing system continues to operate after placing the real memory portions in DPD mode.

In a method embodiment a method empties real memory portions by copying pages to other real memory portions. Empty real memory portions are subsequently placed in the DPD mode. Advantageously, only sparse real memory portions are emptied, to reduce overhead, although, in general, any real memory portion could be a candidate for emptying. The computing system continues to operate after the empty real memory portions are subsequently placed in the DPD mode because the data that had been stored within the empty real memory portions is still resident in another real memory portion.

In an embodiment, the method knows power consumption requirements for real memory portions available to the computing system, and empties a first set of one or more real memory portions into a second set of one or more real memory portions, subsequently placing the first set into a DPD mode, the total power of the second set being less than the total power of the first set. Some or all of the second set of real memory portions may need to be switched from a DPD mode to a non-DPD mode prior to emptying the first set of real memory portions into the second set of real memory portions.

In an embodiment, a system administrator or a designer of the computer system determines a sparse threshold. Real memory portions filled more than the sparse threshold are not considered as candidates for emptying by the method.

In another embodiment, the method checks for opportunities to reduce power by emptying real memory portions and putting emptied real memory portions into DPD mode after expiration of a predetermined time interval. In a variation of this embodiment, the time interval expands as the computer system workload increases and shrinks as the computer system workload reduces.

In an embodiment, the method works more aggressively to reduce power when the computing system is relatively idle. For example, when the computing system is heavily loaded, substantially none of the real memory portions are in DPD mode; however, when the computing system is lightly loaded, the method checks more often for opportunities to empty real memory portions and place them into DPD mode. The sparse threshold can also be increased when the computing system is lightly loaded.

In an embodiment a computer system has a plurality of real memory portions, one or more of which is capable of being placed in a DPD mode. Sparse real memory portions are emptied into other real memory portions, with the empty real memory portions placed in DPD mode.

DETAILED DESCRIPTION OF THE PREFERRED EMBODIMENTS

The invention will be described in detail with reference to the figures. It will be appreciated that this description and these figures are for illustrative purposes only, and are not intended to limit the scope of the invention. In particular, various descriptions and illustrations of the applicability, use, and advantages of the invention are exemplary only, and do not define the scope of the invention. Accordingly, all questions of scope must be resolved only from claims set forth elsewhere in this disclosure.

The current invention teaches a method and apparatus for a reduction in power consumption in a computing system by moving pages from some real memory portions within a plurality of volatile real memory portions to other real memory portions within the plurality of volatile real memory portions. Real memory portions containing no pages (empty real memory portions) can be placed in a Deep Power Down (DPD) mode, thereby reducing power consumption by the computing system. The computing system continues to operate after completion of the moving pages to empty the some real memory portions into the other real memory portions and placing the empty real memory portions in the DPD mode. DPD is a mode implemented in modern DRAMs. When placed in DPD mode, very little power is consumed by a DRAM, but data stored in the DRAM is lost. The term DPD is used herein to denote any mode in any memory (e.g., DRAM, SRAM, or other such volatile memory devices) that causes a dramatic reduction of power but causes loss of data. DRAM memory is used for illustrative purposes, but the invention is not limited to DRAM memory.

Figure 1:
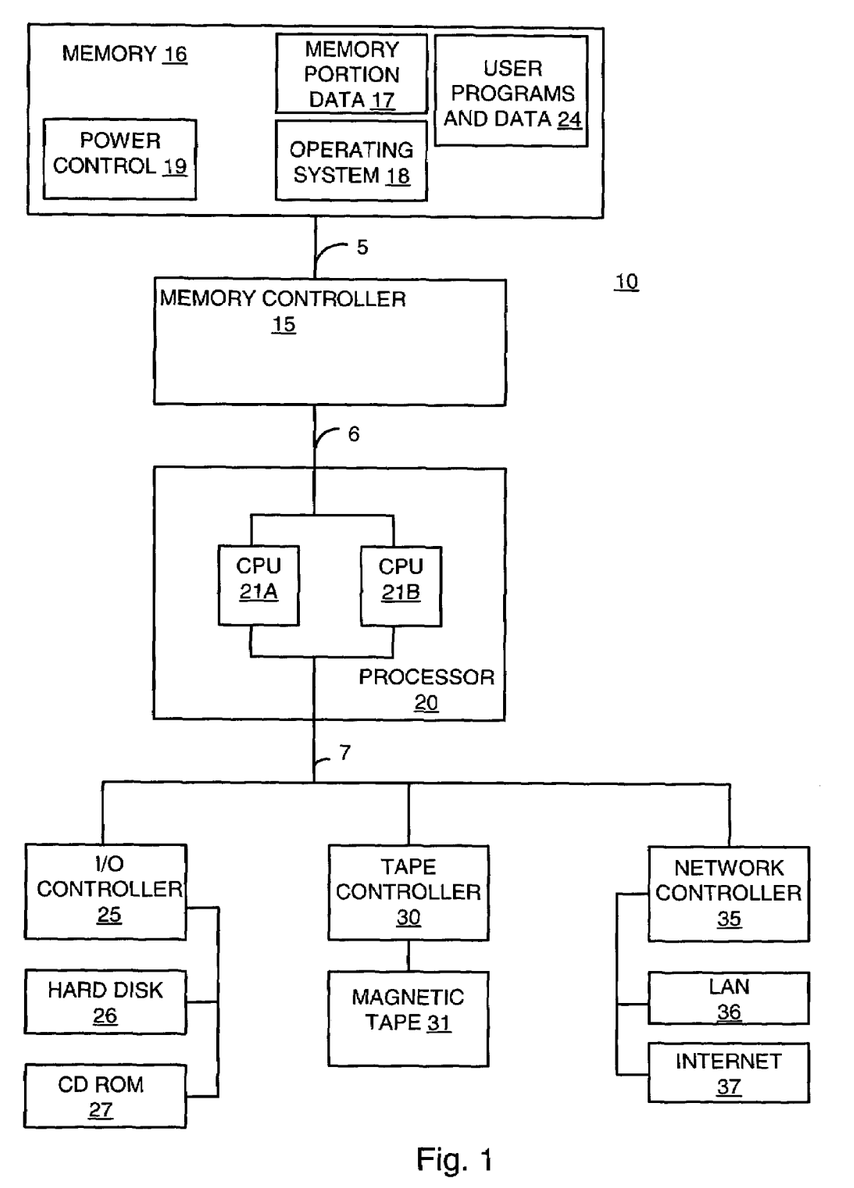
FIG. 1 is a block diagram of a computing system suitable for reduction of power consumption by use of selective use of DPD in a memory coupled to the computing system.

Referring now to FIG. 1, an exemplary computing system 10 is illustrated. Computing system 10 has a processor 20, which may further comprise multiple CPUs (central processing units) 21A, 21B. Processor 20 is coupled to a memory controller 15 by a first bus 6. Memory controller 15 performs necessary fetch and store operations, maintains cache coherency, and keeps track of where pages of memory are stored in real memory. Memory 16 is coupled to memory controller 15 by a second bus 5. Memory 16 contains an operating system 18, a memory portion data 17, a power control program 19, and user programs and data 24. Memory 16 is constructed of real memory portions, such as cards containing memory chips (e.g., DRAM chips), or DIMMs (dual inline memory modules), or any other suitable unit of memory. For example, a computing system might have a memory 16 made up of four 128 MB DIMMs. Memory portion data 17 contains information about real memory portions implemented in memory 16. For example, memory portion data 17, in various embodiments, contains size (e.g., in megabytes) of each real memory portion; power of each real memory portion; a value for a power mode (described later); a power threshold (described later); and a value for a sparse threshold (described later).

Processor 20 is coupled by a third bus 7 to various I/O devices, including, but not limited to, an I/O controller 25, a tape controller 30, and a network controller 35. I/O controller 25 is coupled to a hard disk 26 (which could be an entire hard disk subsystem), and a CD ROM 27. Other I/O devices, such as DVDs are contemplated. Tape controller 30 is further coupled to magnetic tape unit 31. In the illustrated embodiment magnetic tape unit 31 is shown coupled to magnetic tape unit 30, but in an alternative embodiment could be coupled to an entire magnetic tape subsystem, having any number of physical magnetic tape drives. Network controller 35 is coupled to a LAN (Local Area Network) 36 and an internet connection 37.

It will be understood that there are a large number of ways to configure a computing system, and computing system 10 is shown for illustrative purposes only.

Figure 2A:
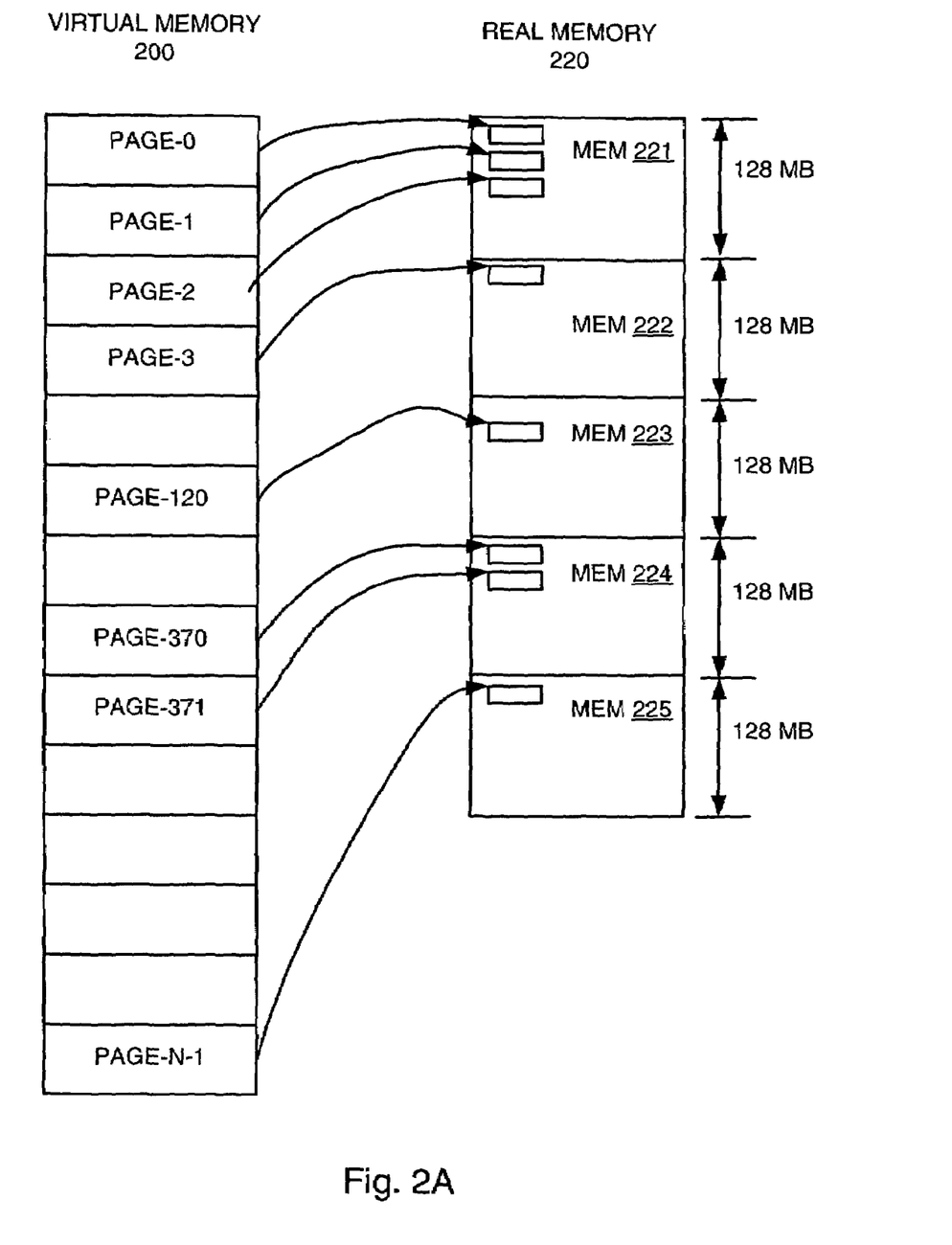
FIG. 2A shows a virtual memory having pages. The pages are mapped to locations in real memory.

FIG. 2 shows an illustrative mapping of pages in a virtual memory 200 to pages in a real memory 220. Programmers typically deal with virtual memory, and are insulated from the details of where data is physically stored in real memory by operating system 18. For example, a user's view of memory might be as addressed by a 32 bit virtual address, and therefore, the user sees 4 GB (gigabytes) of continuous addressing space in memory, wherein the user can address any byte in that address space. The user typically has no idea of where a particular byte is physically stored in the computing system. However, operating system 18 partitions the virtual address space into pages, a page typically having 4 KBs of data. The present invention is not limited to any particular page size, and 4 KB is used for exemplary purposes only. Virtual memory 200 is shown to have "N" pages (i.e., page-0 through page-N-1. When an application requires storage, operating system 18 allocates one or more pages of virtual memory (memory in a virtual page accessed by a "virtual address") to the application and determines where in real memory 220 the page or pages are to be stored (allocated), which is then accessed by a "physical address". Operating system 18 keeps a cross-reference between each page in virtual memory 200 that has been allocated and the location in real memory 220 where the page is kept. In other words, when data is to be accessed, operating system 18 maps the virtual address to a physical address to store/fetch the data.

In the example of FIG. 2A, Page-0, page-1, and page-2 in virtual memory are stored in real memory portion 221. Real memory portion 221, as explained earlier, in various implementations can be a DIMM, a memory card, or any other physical piece of memory designated by the designer as a real memory portion. Page-3 is stored in real memory portion 222. Page-120 is stored in real memory portion 223. Page-370 and page-371 are stored in real memory portion 224. Page-N-1 is stored in real memory portion 225. Arrows between virtual memory 200 and real memory 220 indicate the cross-reference maintained by operating system 18.

Note that, for most users, the actual location in real memory 220 is not of concern, and such users rely on operating system 18 to handle the details of mapping addresses of virtual memory 200 to physical addresses to access data in real memory 220. For these users, operating system 18 is free to move pages in real memory 220 from a first physical location to a second physical location, including to different real memory portions. Some applications, such as device drivers, can have knowledge of the location of pages in real memory 220 in order to have hardware (e.g., a PCI network adapter) directly access data in real memory 220. In such cases, the real memory page is a "wired" or "pinned" page, meaning that it must always be at the same physical location and cannot be moved. Operating system 18 accommodates such pinned pages and ensures that they are not moved.

FIG. 2A illustrates how real memory portions tend to become sparse, that is, have far fewer pages allocated to them than they are capable of storing.

Figure 2B:
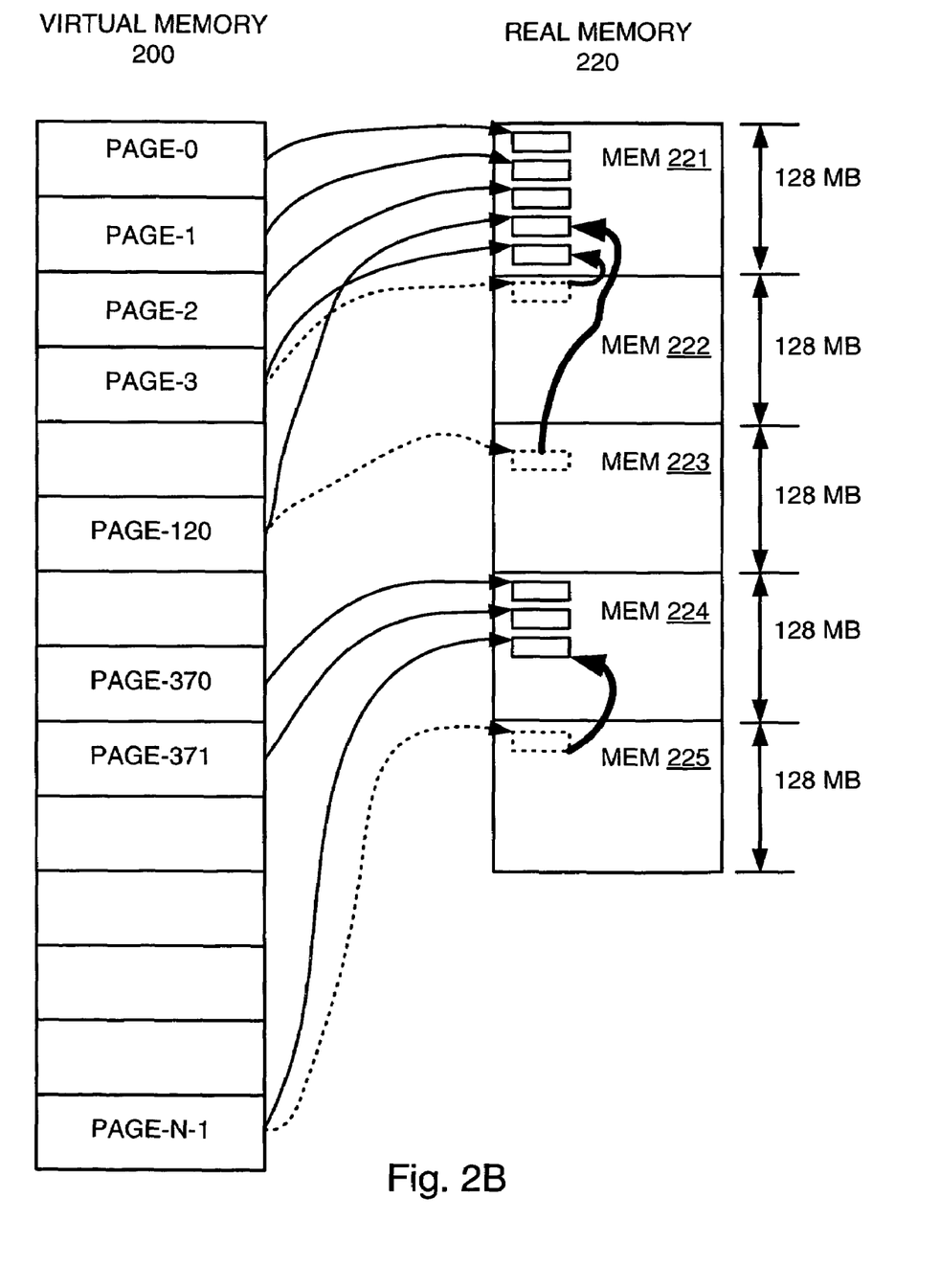
FIG. 2B shows movement of pages from some real memory portions to other real memory portions, as well as a change in the virtual memory to real memory cross-reference corresponding to the movement of pages.

FIG. 2B illustrates how real memory portions 222, 223, and 225 can be emptied by power control program 19, acting in cooperation with operating system 18. Page-3 is moved from real memory portion 222 to real memory portion 221. Operating system 18 accordingly modifies its cross-reference (often called a translation table). Page-120 is similarly moved from real memory portion 223 to real memory portion 221. Page-N-1 is moved from real memory portion 225 to real memory portion 224. The solid arrows from virtual memory 200 to real memory 220 indicate the cross-reference after movement of pages; the dashed arrows indicate the cross-reference prior to movement of pages. The bold arrows within real memory 220 indicate the movement of pages.

Figure 2C:
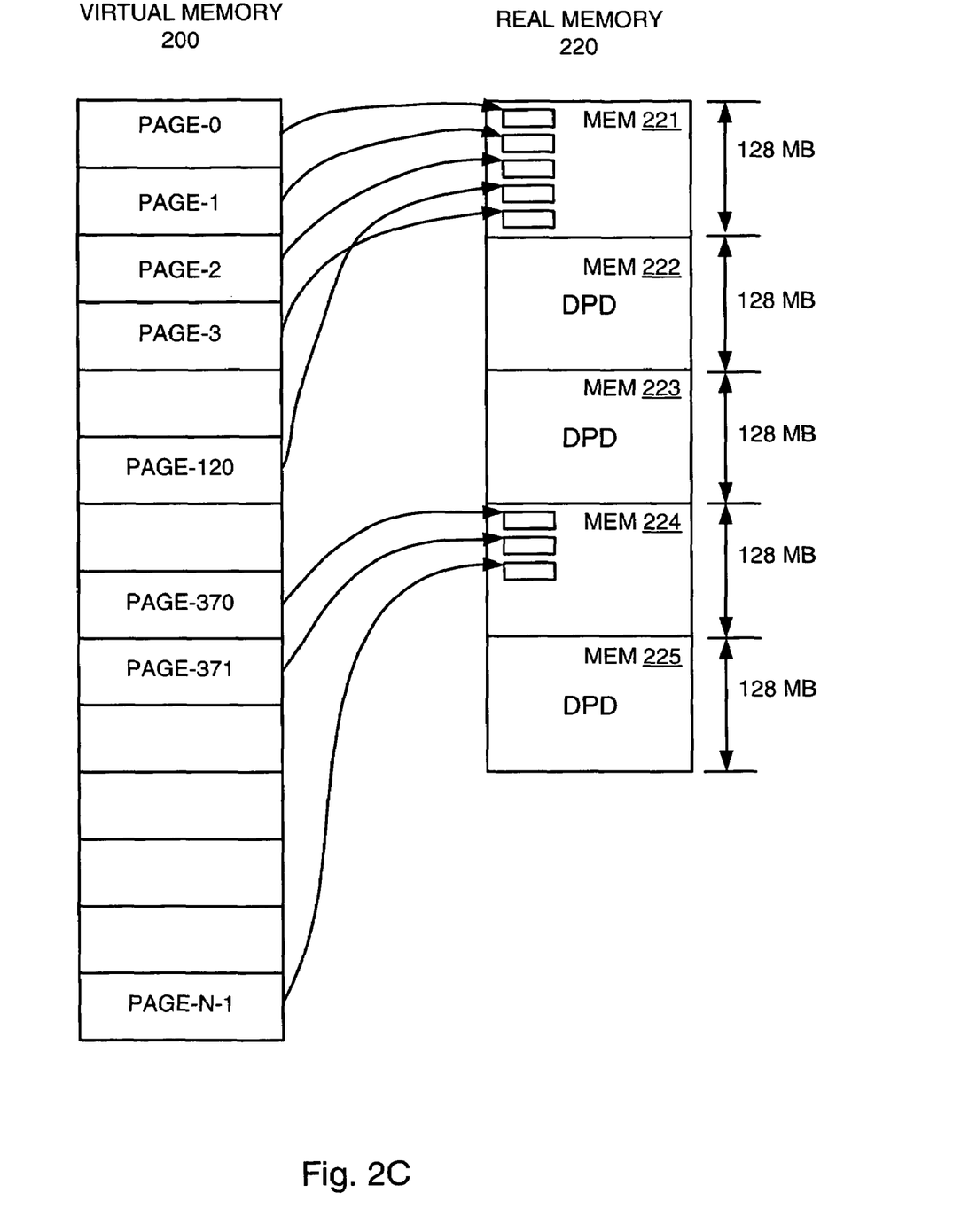
FIG. 2C shows the allocation of pages in real memory portions after the movement illustrated in FIG. 2B, with now-empty real memory portions placed in DPD mode.

FIG. 2C illustrates allocated pages in real memory 220 following the moves described relative to FIG. 2B. Empty real memory portions 222, 223, and 225 contain no data needed by the computing system, and are placed in a DPD mode, thereby saving power.

In the example illustrated in FIGS. 2A-2C real memory portions 222, 223, and 225 were shown has having but a single real page allocated. Typically, some real memory portions have relatively few pages allocated to them. Advantageously, a sparse threshold value is provided by the designer of the computer system (or an administrator of the computer system). Although power is saved by placing a real memory portion into DPD mode, moving pages from one real memory portion to another takes time. A real memory portion having a number of allocated pages greater than the sparse threshold is not considered a candidate for having pages moved from that real memory portion. For example, if a particular real memory portion contains 128 MB of memory, that real memory portion can contain 32,000 pages. The designer (or administrator) may set, for example, a value of 100 as the sparse threshold, meaning that if more than 100 pages are allocated to the particular 128 MB real memory portion, no effort will be made to empty that particular real memory portion. Similarly, if 100 or less pages are allocated to the particular 128 MB real memory portion, the 100 or less pages can be moved to a different real memory portion to empty the particular real memory portion, with the particular real memory portion subsequently placed in a DPD mode.

Figure 3A:
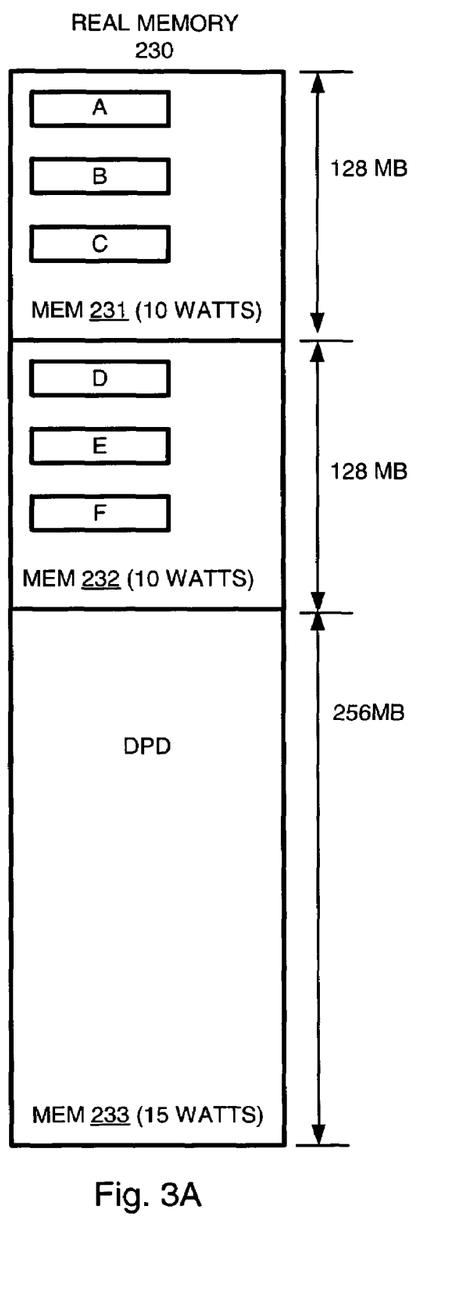
FIG. 3A shows a real memory having three real memory portions, with pages allocated in the first two real memory portions.
Figure 3B:
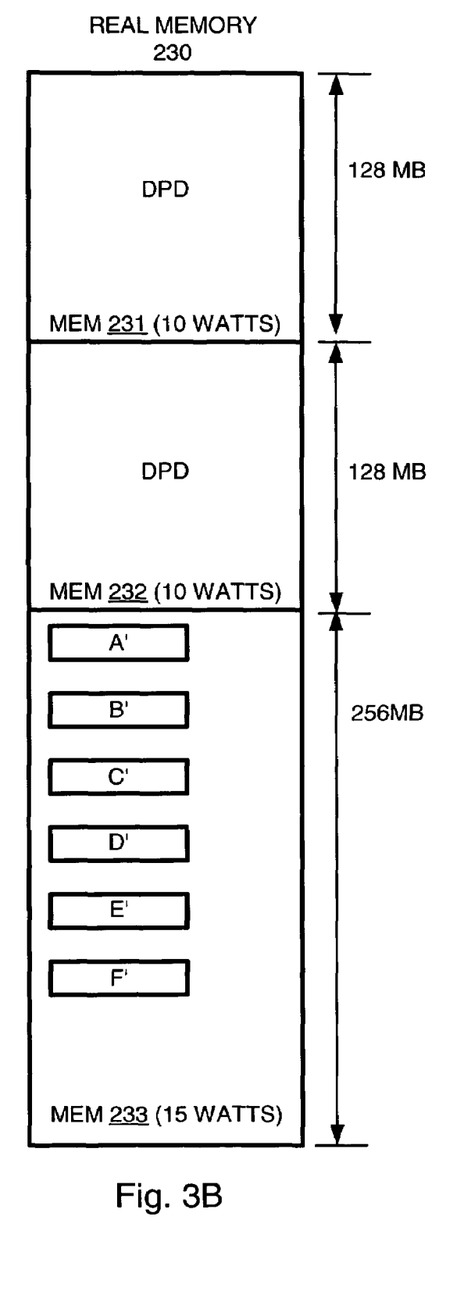
FIG. 3B shows the real memory after movement of pages from the first two real memory portions to the third real memory portion.

FIGS. 3A and 3B illustrate another embodiment of the invention, which can be combined with the embodiment described above, or implemented separately. FIG. 3A illustrates a real memory 230 having a real memory portion 231 having 128 MB of capacity, and having pages A, B, and C allocated within real memory portion 231. Real memory portion 231 consumes 10 watts of power when not in DPD mode (i.e., in normal operating mode). Real memory 230 further contains real memory portion 232 having 128 MB of capacity, and having pages D, E, and F allocated within real memory portion 232. Real memory portion 232 consumes 10 watts of power when not in DPD mode. Real memory portion 230 further contains real memory portion 233 having a capacity of 256 MB and being in a DPD mode. Memory portion data 17 contains power for each real memory portion, obtained from the engineering specification for each real memory portion, measurement, or other means to determine how much power each real memory portion consumes when active (i.e., not in DPD mode). Power control program 19 determines that power can be saved by bringing real memory portion 233 out of DPD mode, moving pages A-F into real memory portion 233, and subsequently putting real memory portions 231 and 232 into DPD mode, saving five watts (10 watts+10 watts−15 watts). Power control program 19 again uses the sparse threshold value from memory portion data 17 to select real memory portions for consideration for emptying and placing into DPD mode. Furthermore, a power threshold value can be specified by the designer and stored in memory portion data 17. The power threshold is used by power control program 19 to determine if overhead involved in moving pages is worth the power savings that would result. For example, if the power threshold were specified as 10 watts, the movement described earlier in this paragraph would not be performed.

Real memory portion 233 of FIG. 3A was shown as empty and in DPD mode for illustrative purposes. However, the method described above, which seeks to move allocated real pages into real memory portions such that real memory portions that are emptied can be put into DPD mode, does not require real memory portion 233 to start out in DPD mode. For example, FIG. 3A could have shown real memory portion 233 as in a non-DPD mode and having a number of allocated pages. Then, (assuming that space exists in real memory portion 233) A-F could still be moved to real memory portion 233 as shown in FIG. 3B as pages A'-F'. Power would then be reduced from 35 watts to 15 watts (10 watts+10 watts+15 watts)−(10 watts+10 watts).

Figure 4A:
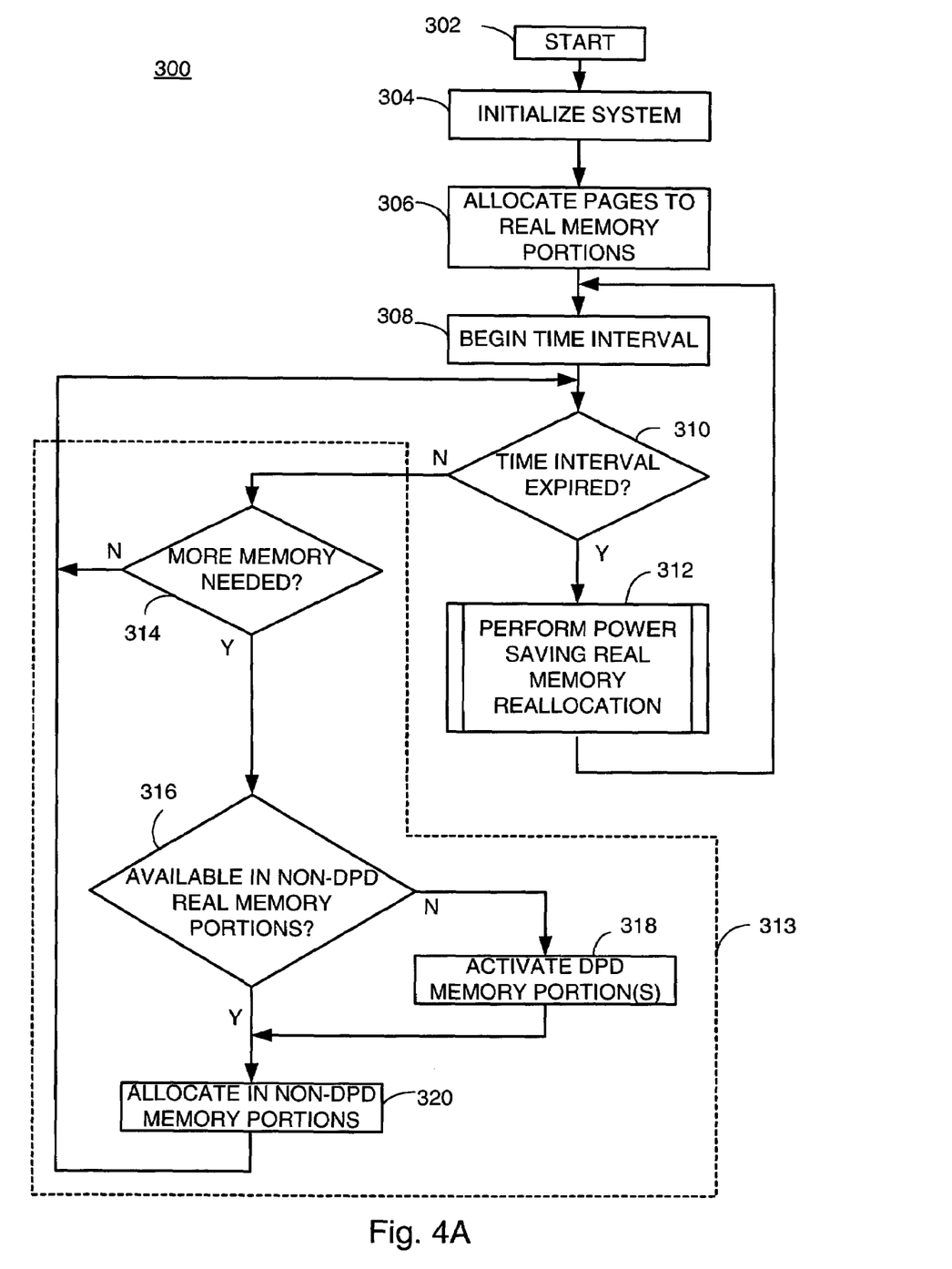
FIG. 4A is a flowchart of a method used to reduce power consumption in a computing system.

FIG. 4A shows a high level flowchart of a method 300 that implements an embodiment of the invention. Method 300 starts at step 302. In step 304 the computing system is initialized. Different computing systems have different initialization procedures; however, most do some form of self-test to identify any component that is not operating properly (e.g., one or more disks being offline or faulty; one or more real memory portions being offline or faulty; and similar exception cases) and what resources the computing system has (e.g., amount of total memory available). During initialization, the operating system is usually loaded into memory, such as memory 16 of FIG. 1.

In step 306, the operating system (e.g., operating system 18 of FIG. 1) allocates pages of virtual memory and cross-references these pages to the locations in real memory portions allocated to the pages of virtual memory. Different computing systems use various methods of cross-referencing virtual pages to the locations in real memory portions.

In step 308, a time interval is begun by a power control program, which in some implementations is considered to be part of the operating system. The duration of the time interval determines how often the power control program attempts to reduce power consumption by emptying real memory portions and placing those empty real memory portions into a DPD mode. The interval is set by the designer or system administrator to be long enough not to degrade system performance, but often enough that if any real memory portions have become sparse, the sparse real memory portions can be emptied and put into a DPD mode to save power. In alternative embodiments, the power control program can change the time interval with cooperation of the operating system. For example, if the computing system is very busy, the time interval can be extended so that overhead involved in moving pages does not degrade throughput of the computing system. Similarly, if the computing system is relatively idle, power control program can shorten the time interval in order to save power consumption without significantly degrading throughput of the computing system.

Step 310 checks to see if the time interval has expired. If the time interval has not expired, control passes to sub-method 313, which increases available memory if required. Step 314 checks if more memory is needed by a program running on the computer system. Step 314 may use an immediate need for more memory as its check (i.e., a request from a program for additional memory). Alternatively, step 314 may use more general criteria, such as thrashing measurements, latency measurements for memory requests and the like as an indicator that more memory is needed. The program can be the operating system itself, or a user program. If no more memory is needed, control passes back to step 310. If more memory is needed, control passes to step 316, which checks to see if active (i.e., non-DPD real memory portions) contain enough free space to satisfy the request for more memory. If so, the request for more memory is accommodated by step 320 in non-DPD real memory portions. If non-DPD real memory portions do not have enough free space to accommodate the request, then control passes to step 318, which activates (i.e., brings out of DPD mode) one or more real memory portions, then passes control to step 320 for accommodating the request for more memory. Advantageously, step 318 considers the size of the request for more memory, the size of real memory portions that are in DPD mode, and the power that each of the real memory portions that are in DPD mode would consume if activated (using, e.g., information stored in memory portion data 17, as described earlier). A request for a small amount of memory might be accommodated by activating a relatively small real memory portion (e.g., the ten watt 128 MB real memory portion 231 of FIG. 3A). A request for a large amount of memory might be accommodated by activating a relatively large real memory portion (e.g., the 15 watt 256 MB real memory portion 233 of FIG. 3A).

Upon expiration of the time interval, step 310 passes control to step 312, which performs a reallocation of pages from one or more real memory portions, emptying those real memory portions, to one or more other real memory portions and placing empty real memory portions into DPD mode.

Figure 4B:
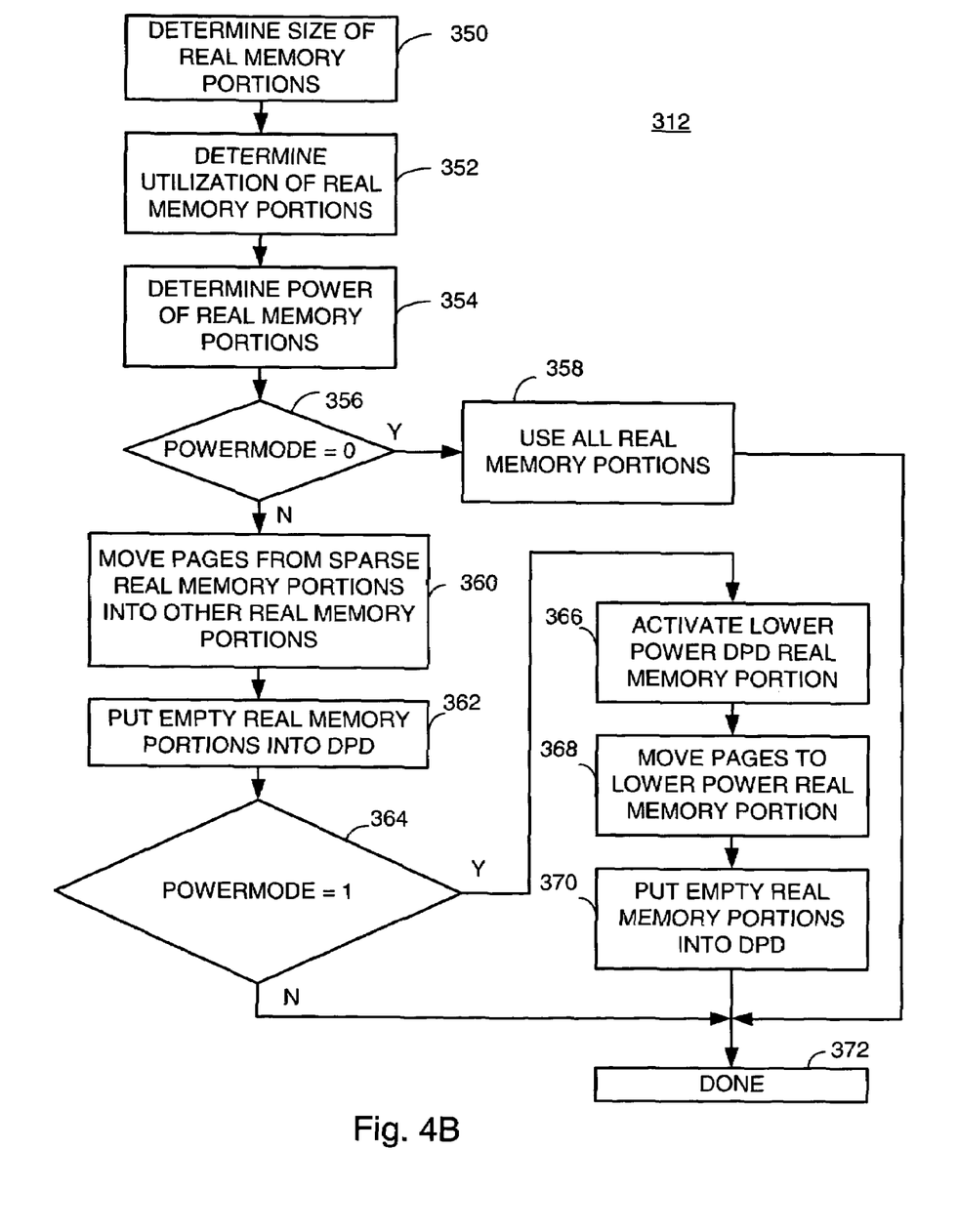
FIG. 4B is a flowchart showing more detail of a step in the flowchart of FIG. 4A.

An embodiment of step 312 is shown in more detail in FIG. 4B. Step 350 determines the size (i.e., megabytes) of each real memory portion, either dynamically, or by reading the information from memory portion data 17 (FIG. 1). In a variant of method 300, step 350 is omitted from step 312 and is performed as part of step 304 (system initialization).

Step 352 determines utilization of active real memory portions. The operating system (e.g., operating system 18 shown in FIG. 1) knows where each allocated page of virtual memory is stored, and power control program uses this information to determine utilization (i.e., how full or sparse) each real memory portion is.

Step 354 determines power of real memory portions when active (i.e., not in DPD mode). The invention contemplates also having available knowledge of how much power real memory portions consume when in DPD mode, but this is typically a negligible amount of power. In an alternative embodiment of method 300, step 354 is omitted from step 312 and is performed as part of step 304 (system initialization).

In step 356, a check is made to see if the value of powermode is zero, which indicates that the designer or system administrator has disabled the power saving features taught by the present invention. The value of powermode is advantageously stored in memory, such as in memory portion data of FIG. 1. Disabling the power saving features might be desirable if power consumption is of little or no concern to a particular user. If powermode=0 control passes to step 358; all real memory portions are placed in non-DPD mode. Control then passes to step 372, the completion of the method.

If powermode is not zero, control passes from step 356 to step 360. Step 360 selects a set of real memory portions to empty (copy pages to other real memory portions, update the cross-reference). Selection uses one or more of the information determined in steps 350, 352, and 354. That is, sparse real memory portions are selected. In an embodiment, a first particular sparse real memory portion having a relatively higher power per unit of memory (e.g., megabyte) is considered for emptying before a second particular sparse real memory portion having a relatively lower power per unit of memory. Step 360 then empties the selected sparse real memory portions by moving pages from the sparse real memory portions to other real memory portions having space available. The cross-reference is updated to the new physical location of each moved page. In step 362, empty real memory portions are placed into DPD mode.

In step 364, the value of powermode is again checked. If powermode=1, the power control program begins a series of steps to reduce power by emptying (and subsequently placing into DPD mode) some real memory portions if lower power real memory portions are available and have capacity to store pages moved from the real memory portions that are emptied. For example, the plurality of volatile real memory portions might include some real memory portions constructed of SRAM memory and other real memory portions constructed of DRAM memory. Typically, SRAM memory consumes more power per unit of storage (e.g., byte) than DRAM memory. Larger units of DRAM memory typically consume less power per unit of storage than smaller units of DRAM memory (e.g., a 256 MB DIMM typically consumes less power per byte than two 128 MB DIMMS). The value of powermode is set by the system designer or system administrator, as described above. If a particular real memory portion in a DPD mode having lower power consumption (if activated) than one or more relatively higher power consumption real memory portions that are in non-DPD mode, the particular real memory portion is activated (changed to non-DPD mode) in step 366. In step 368, the relatively higher power consumption real memory portion(s) are emptied by copying pages from them into the particular real memory portion. The cross-reference is updated accordingly. In step 370 the relatively higher power consumption real memory portion(s) are placed into DPD mode. Step 372 ends the detailed method of step 312.

Figure 4C:
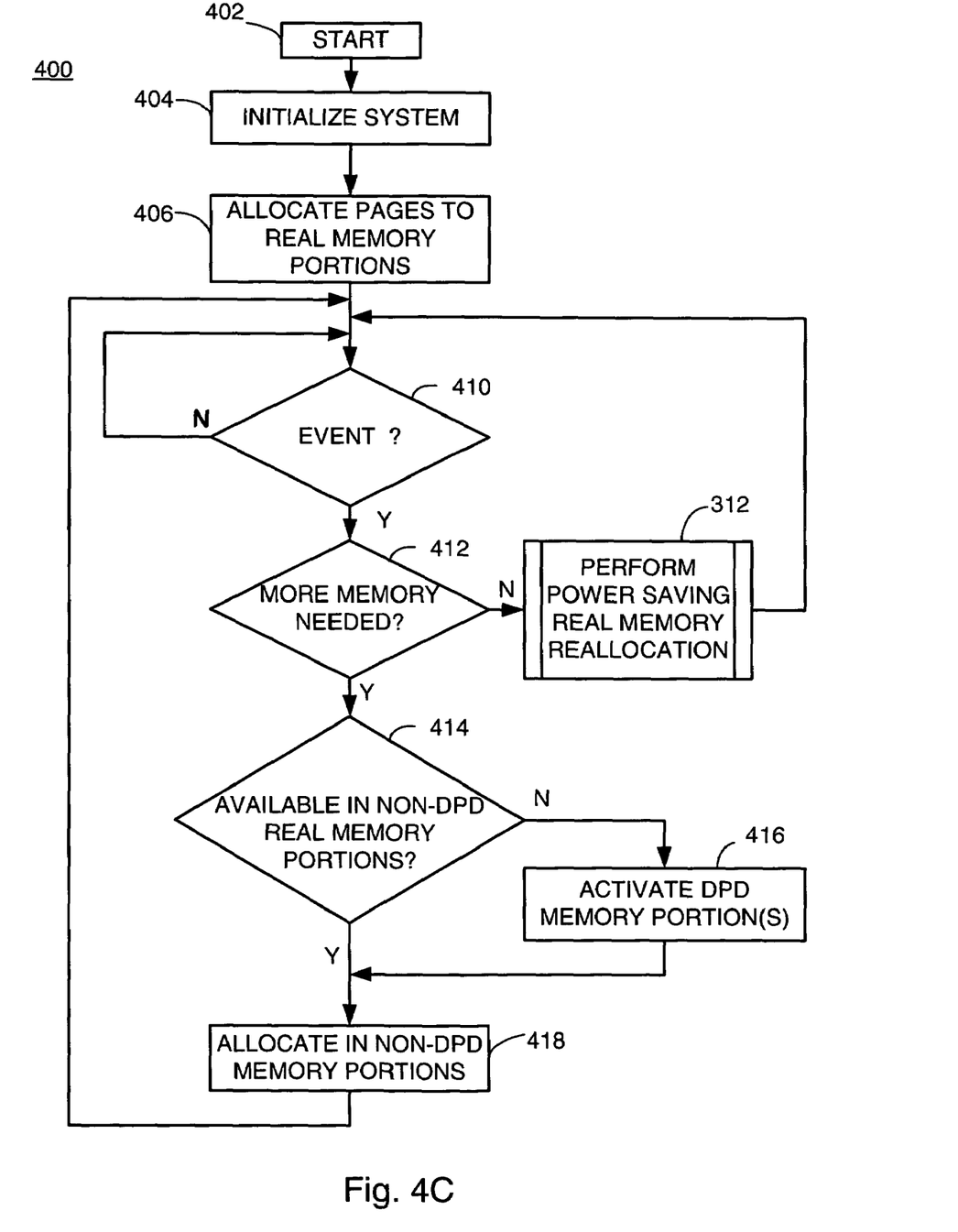
FIG. 4C is a flowchart showing an embodiment of the invention responsive to an event.

FIG. 4C shows a flow chart of another embodiment of the invention, illustrating method 400. Steps 402, 404, and 406 respectively start, initialize the system, and allocate pages to real memory portions, similar to steps 302, 304, and 306 of method 300. Method 400, in contrast to method 300, responds to events to attempt to reduce power by emptying real memory portions in a plurality of volatile real memory portions by copying pages to other real memory portions in the plurality of volatile real memory portions, updating the cross-reference from virtual page addresses to real page addresses, and subsequently placing the empty real memory portions into DPD mode.

Step 410 waits for an event to occur. Such an event might be the completion of a program (task, job, etc) that had been running on the computing system. The event might be a starting of a program or a request from a running program for more memory. Typically, when a program ends, a large amount of memory is freed up; when a program starts, a large amount of memory is needed. In a laptop computer (or other battery powered computing system), the event might be when the laptop computer is unplugged from an AC outlet (i.e., power is of more concern when the laptop computer is drawing its power from a battery). In other words, the event is a change in a source of power for the computing system. In a large computing system having logical partitioning capability, a change in logical partitioning might be the event. The present invention contemplates any event occurring with a computing system that a designer of a computing system chooses to change power consumption on the computing system. Upon detection of the event, step 412 checks to see if the event requires more memory (a new memory requirement). If so, control passes to step 414. If not, method 312 is performed. Method 312 was previously described in FIG. 4B. If step 412 is true, i.e., more memory is needed, control passes to step 414, which checks if sufficient memory is available in non-DPD real memory portions to satisfy the new memory requirement. If not, step 416 is performed to activate enough non-DPD real memory portions (i.e., change mode from DPD to non-DPD) to satisfy the new memory requirement. It will be understood that only enough real memory portions must be activated to satisfy the new memory requirement after already non-DPD real memory portions are used to accommodate the new memory requirement. For example, if step 414 determines that if the memory request requires two real memory portions of memory, but enough available space in non-DPD real memory portion(s) will satisfy one of the two real memory portions worth of space, only a single additional real memory portion needs to be activated.

What is claimed is:

1. A method for reducing power consumption in a computing system comprising the steps of:

selecting a first real memory portion from a plurality of volatile real memory portions for emptying and subsequently being placed into a Deep Power Down (DPD) mode;

emptying the first real memory portion into a second real memory portion in the plurality of volatile real memory portions;

determining a first power consumption value for the first real memory portion;

determining a second power consumption value for the second real memory portion;

if the first power consumption value is greater than the second power consumption value, emptying the first real memory portion into the second real memory portion; and if the second power consumption value is greater than the first power consumption value, emptying the second real memory portion into the first real memory portion.

2. A computing system capable of operating at a reduced power consumption comprising:

a processor;

a memory further comprising a plurality of volatile real memory portions, at least one real memory portions in the plurality of volatile real memory portions being capable of being placed in a Deep Power Down (DPD) mode;

a memory data portion in the memory configured to store information about power consumption of the at least one real memory portions capable of being placed in the DPD mode; and a power control program executable by the processor that is configured to empty, using the information about power consumption, at least one of the plurality of real memory portions into one or more other real memory portions and subsequently placing the at least one of the plurality of real memory portions in the DPD mode.

* * * * *